United States Patent [19]

Saurin et al.

[11] 4,152,573
[45] May 1, 1979

[54] CAN MANUFACTURING METHOD AND DEVICE FOR CARRYING OUT THE SAID METHOD

[76] Inventors: Emmanuel E. V. V. Saurin, 28, rue Eugene Prevost, Lagny, France, 77 400; Ezio V. Gariglio, 1, Allee du Roussillon, Neuilly-sur-Marne, France, 93 330

[21] Appl. No.: 758,785

[22] Filed: Jan. 12, 1977

[30] Foreign Application Priority Data

Jan. 20, 1976 [FR] France .............................. 76 01400

[51] Int. Cl.² .............................................. B23K 9/00
[52] U.S. Cl. ....................... 219/121 L; 219/121 LM; 228/151
[58] Field of Search ................ 228/15.1, 44.1 R, 150, 228/151; 219/121 L, 121 LM, 161, 60 R

[56] References Cited

U.S. PATENT DOCUMENTS

| | | | |
|---|---|---|---|
| 1,449,369 | 3/1923 | Anderson | 219/60 R X |
| 2,727,301 | 12/1955 | Magnus | 228/150 |
| 2,849,592 | 8/1958 | Hawthorne | 219/161 X |
| 3,118,406 | 1/1964 | Stanton | 219/151 X |
| 3,517,159 | 6/1970 | Milochevitch | 219/121 L |
| 3,855,445 | 12/1974 | Jungle | 219/121 EB |

*Primary Examiner*—J. V. Truhe
*Assistant Examiner*—Fred E. Bell
*Attorney, Agent, or Firm*—Steinberg & Blake

[57] ABSTRACT

A method for manufacturing a sheet-metal container the body of which is obtained by forming a metal sheet into a tube; two opposite edges of said metal sheet being thus joined and assembled each other, wherein the improvement consists in that said opposite edges are welded together by the action of a laser beam.

6 Claims, 3 Drawing Figures

U.S. Patent
May 1, 1979
4,152,573
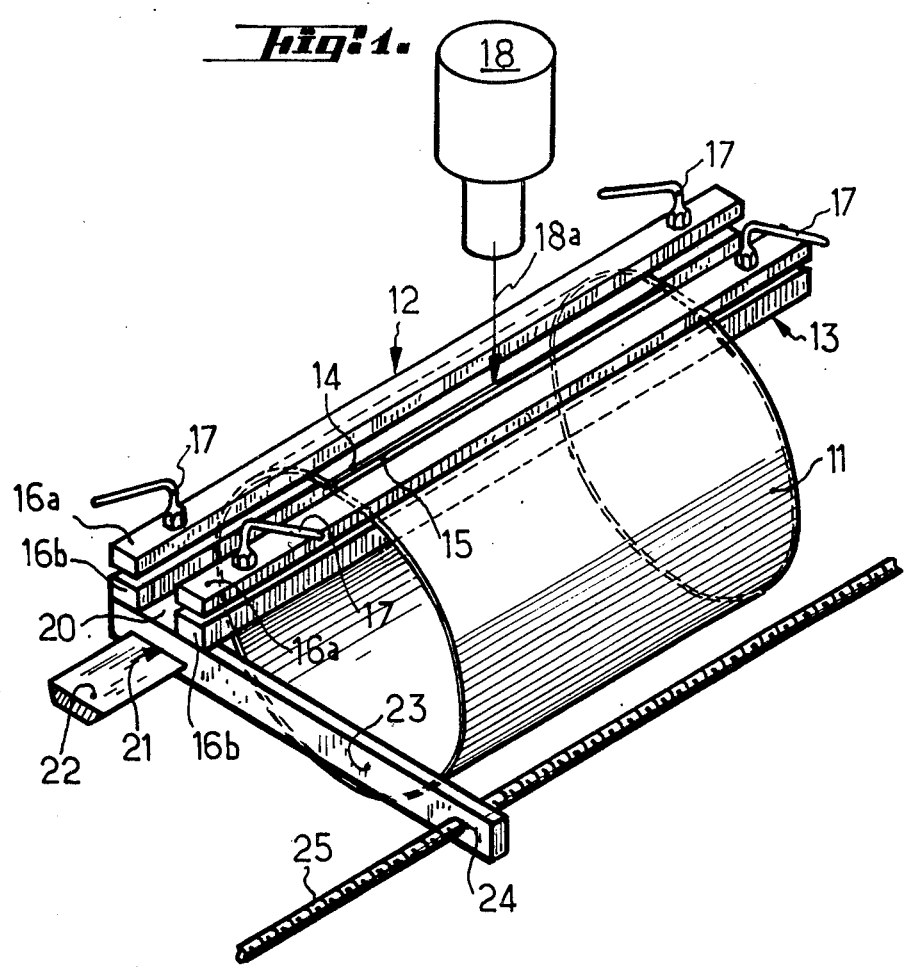
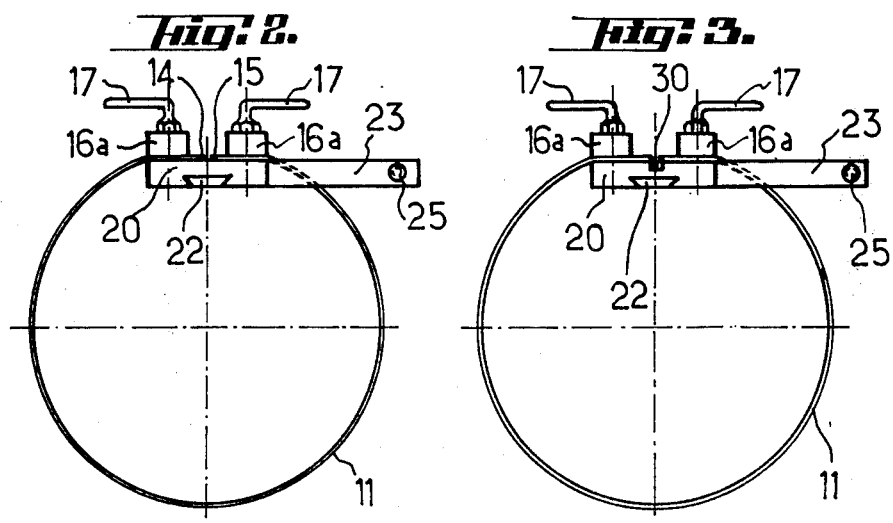

CAN MANUFACTURING METHOD AND DEVICE FOR CARRYING OUT THE SAID METHOD

The present invention has essentially for its object an improved method of manufacture of preserved-food cans or tins. More specifically, the invention relates to the use of laser beam welding for joining the adjacent confronting edges of a tube intended to constitute the body of a preserved-food can or tin.

It is known that the tubular bodies of preserved-food cans are manufactured by soldering the mutually opposite sides of a rectangular metal sheet formed into a ring, cylinder or like shape so as to constitute a tube with adjacent confronting edges. The filler metal (solder) generally employed for the soldering is an alloy of lead and tin. The opposite sides of the metal sheet are either placed together in overlapping relationship or lock-seamed to one another, which necessarily results in a surplus thickness of material at least equal to the thickness of the rectangular base sheet. This surplus thickness makes it very difficult to lock-bead the can bottom at the joint of the tube, so that a lack of tightness is frequently observed at that location. Moreover, there is the risk of the filler metal penetrating the can, resulting in a hazard of contamination by the filler lead, which is toxic.

The present invention allows all the aforementioned drawbacks to be avoided, since the opposite sides of the tube with adjacent confronting edges intended to constitute the can body are assembled edge to edge without surplus thickness and preferably by autogenous welding, i.e. without using a lead-based filler alloy.

More precisely, the invention relates to a can manufacturing method, characterized in that the can body is obtained by forming a metal sheet into a tube with adjacent confronting edges, holding together the said edges and welding them together by means of a laser beam.

The welding is preferably autogenous, and its has been deemed preferable to perform the same by longitudinally displacing the tube-shaped metal sheet in front of a stationary laser beam, thereby ensuring higher welding accuracy.

The invention also relates to a can manufacturing device, more particularly for carrying out the above method, characterized in that it comprises two longitudinal parallel vices, means for uniformly displacing both vices as a whole in their longitudinal direction and a laser generating device placed opposite the said vices in such a manner that the impact of the laser beam produced thereby passes along substantially the middle line between the said vices.

The invention will be better understood and other purposes, details and advantages thereof will appear more clearly from the following explanatory description given solely by way of example with reference to the appended non-limitative drawing wherein:

FIG. 1 is a diagrammatic perspective view of a device for carrying out the method according to the invention;

FIG. 2 diagrammatically illustrates a modification of the device of FIG. 1; and

FIG. 3 illustrates another modification of the device of FIG. 1.

As seen in the appended drawing, a rectangular metal sheet 11 is formed into a tube with adjacent confronting edges, which is held by two longitudinal parallel vices 12 and 13, the opposite sides 14 and 15 of the said metal sheet 11 being placed edge to edge without overlap. Each vice is made up of two parallel clamping bars 16a, 16b, which are assembled and pressed together by means of clamping screws 17. A laser-beam generating device 18 is arranged above the vices 12 and 13 in such a manner that the laser beam 18a passes substantially along the middle line between the said vices and the impact on the metal sheet 11 is located on the junction line between the opposite sides 14 and 15. The clamping bars 16b remotest from the laser device 18 are secured to a support plate 20 on which are mounted the mechanical means for uniformly displacing both vices 12 and 13 as a whole. In the case considered, the said mechanical means are constituted by a dovetail guide slot 21 provided in the lower portion of the support plate and by means of which the latter can slide along a stationary counter-guide 22 of a complementary shape. The uniform displacement is ensured by a quite simple system comprising a bar 23 fixed to and moving jointly with the plate 20 and provided with a tapped hole 24 in which is passed a threaded rod 25. The rotation of the threaded rod 25 causes a longitudinal displacement of the plate 20 along the counter-guide 22, thus ensuring the autogenous welding of the sides 14 and 15 over the whole height of the can body.

FIG. 2 shows a modification of the invention, wherein the bars 16b are done away with. Thus, the sides 14 and 15 of the tube-shaped metal sheet 11 are applied to and directly engage the support plate 20 during the welding, thus overcoming any possibility of collapse of the edges 14 and 15 towards the interior of the cylinder at the time of welding.

FIG. 3 illustrates another modification, closely similar to the foregoing one, wherein a very fine slot 30 is provided in the base plate 20 exactly at the location where the two sides 14 and 15 are placed edge to edge. Heat losses through the support plate are thus avoided, ensuring a better quality of the autogenous weld.

It is thus apparent that with the invention sheet material portions which respectively terminate in the edges 14 and 15 are placed with respect to each other in such a position that these sheet material portions are in edge-to-edge relation, without any overlap, at these edges which thus form a junction line between the sheet material portions. This junction line is situated in a plane illustrated by the vertical center line of FIG. 2 or FIG. 3. The laser-beam generating means 18 is situated with respect to the sheet material portions to direct the laser beam 18a in this plane which contains the junction line formed by the adjacent confronting edges of the sheet material portions toward and into engagement with the edges at this junction line. In order to maintain these sheet material portions in the above edge-to-edge relation, the sheet material portions are clamped to a support means 20 with clamping forces which extend perpendicularly with respect to the sheet material portions in directions parallel to the above plane, and the sheet material portions are held in edge-to-edge relation as set forth above only by way of these clamping forces so that during welding there are no forces pushing the above edges 14 and 15 toward each other, thus avoiding the possibility of creating a surplus thickness at the weld. The laser-beam generating means 18 and the support mean 20 form a pair of means at least one of which is moved with respect to the other for causing the laser beam and junction line to move one with respect to the other in a manner which will cause a weld to be formed between the sheet material portions at the above junction line in a progressive manner progressing longitudinally along the junction line.

Of course the invention is by no means limited to the forms of embodiment described and illustrated which have been given by way of example only. In particular, it comprises all the means constituting technical equivalents to the means described as well as their combinations should the latter be carried out according to its gist and used within the scope of the following claims.

What is claimed is:

1. Apparatus for manufacturing cylindrical sheet metal food containers, such as cans for containing preserved foods or the like comprising support means carrying a pair of elongated parallel entirely mechanical clamping means for clamping to said support means two opposite edge regions of a sheet metal element formed into a tubular element, the edge regions defining a pair of corresponding mutually confronting edges situated between the pair of clamping means next to each other forming a junction line situated between the pair of clamping means, said clamping means being adapted to cooperate with the sheet metal element for clamping the latter with clamping forces which are substantially perpendicular to the edge regions, said pair of clamping means forming the only means which holds the sheet metal element in edge-to-edge relation forming said junction line, laser-beam generating means having with respect to said support means a location for directing a laser beam toward said junction line to engage the sheet metal element at the junction line formed by the edges thereof, and moving means operatively connected with said clamping means for moving the latter with respect to said laser-beam generating means in a direction causing the sheet metal element to be welded progressively along said junction line, the clamping of the sheet metal element by said clamping means only with forces perpendicular to said edge regions preventing said edges from being pushed toward each other at the junction line to an extent sufficient to create any surplus thickness at the weld which is formed along said junction line.

2. The combination of claim 1 and wherein each clamping means includes an elongated bar carried by said support means, a second bar parallel to said elongated bar, and screws for pressuring said second bar against said elongated bar after a sheet material portion is situated between said bars.

3. The combination of claim 1 and wherein said pair of clamping means respectively include a pair of elongated bars while said support means includes a plate for engaging the sheet material portions with the latter extending between said plate and said bars, and a plurality of screws for pressing said bars toward said plate for clamping the sheet material portions.

4. The combination of claim 3 and wherein said plate of said support means is formed with an elongated groove extending parallel to the junction line for providing a free space at opposite sides of the sheet material portions along this junction line thereof.

5. A method for manufacturing cylindrical sheet metal food containers, such as cans for containing preserved foods or the like, comprising the steps of: forming a sheet metal element having opposed side edges into a tubular element such that said opposed side edges define contiguous confronting edges; holding said confronting edges in contiguous confronting relationship along the entire length of said tubular element by providing clamping forces on edge regions of said sheet metal element in the vicinity of said respective confronting edges thereby defining a straight contact line between said contiguous confronting edges, the direction of said clamping forces being substantially perpendicular to the plane containing said edge regions and produced by entirely mechanical, non-magnetic field producing clamping means; and welding said contiguous confronting side edges together by providing from a laser beam generating means a laser beam impinging on said contact line and displacing said tubular element along its longitudinal axis.

6. The method of claim 5 and wherein the laser-beam welding is autogenous.

* * * * *